Jan. 8, 1957   J. BLADES   2,776,582
COVER FOR MOTOR VEHICLE PEDALS
Filed June 9, 1953
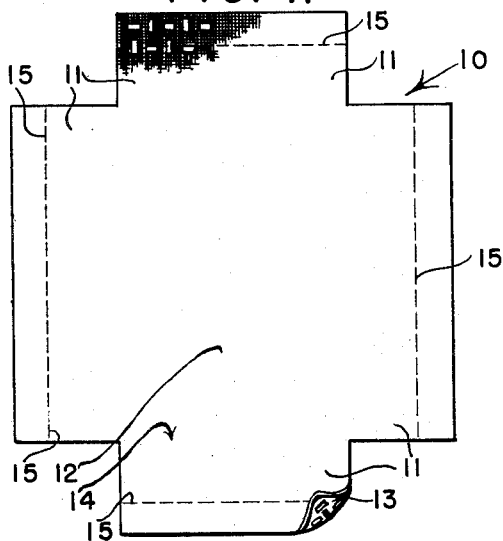
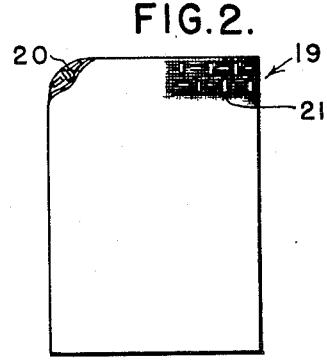
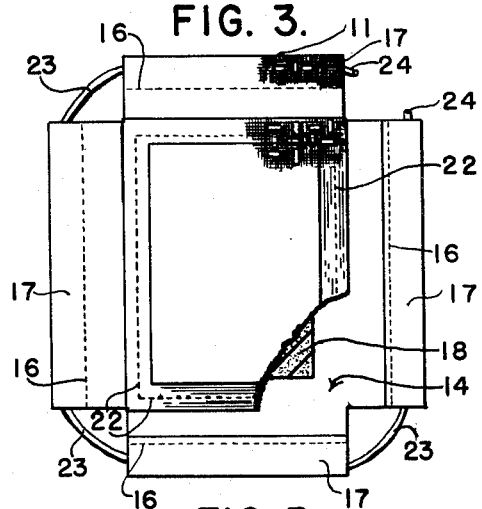
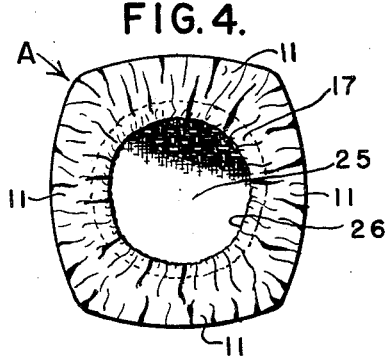
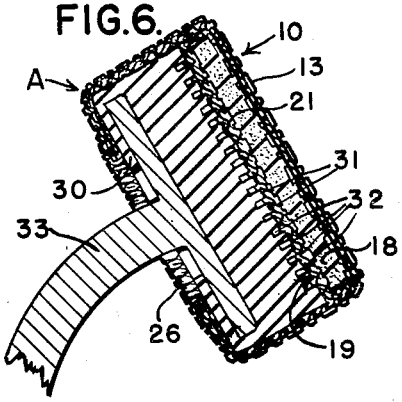
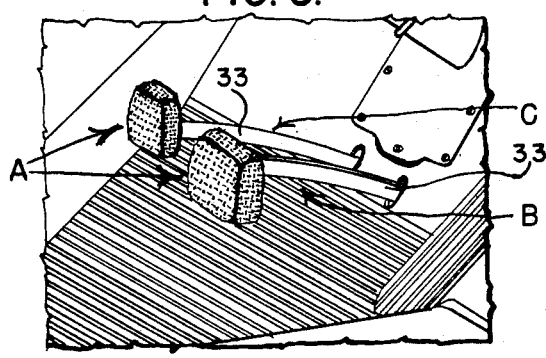
INVENTOR
James Blades
BY *Lancaster, Allwine and Rommel*
ATTORNEYS

2,776,582
COVER FOR MOTOR VEHICLE PEDALS

James Blades, Hillside, N. J.

Application June 9, 1953, Serial No. 360,461

3 Claims. (Cl. 74—563)

This invention relates to pads or covers for motor vehicle pedals.

An important object of the invention is to provide a cover for a motor vehicle pedal head to prevent the shoe sole of the operator from accidentally slipping therefrom.

Another important object is to provide such a cover which is particularly useful when the lower surface of the shoe sole is wet or filmed with ice and thus rendered slippery.

Still another important object is to provide a cover so constructed that it will obviate the undesirable slippery wet-surface which is sometimes encountered on the heads of motor vehicle pedals.

Other objects and advantages of the invention will be apparent during the course of the following detailed description of the invention, taken in connection with the accompanying drawing, forming a part of this disclosure, and in which drawing:

Fig. 1 is a plan of one portion of the cover.

Fig. 2 is a plan of an associated cover portion.

Fig. 3 is a plan of the partly-finished cover.

Fig. 4 is a plan of the completed cover.

Fig. 5 is a perspective view with two covers mounted upon two motor vehicle pedals.

Fig. 6 is an enlarged vertical section through a motor vehicle pedal head and the cover mounted thereon.

In the drawing wherein for the purpose of illustration is shown a preferred embodiment of the invention and wherein similar reference characters designate corresponding parts throughout the several views, the completed cover is designated as A and motor vehicle pedals as B and C.

As shown in Fig. 1 the cover includes an uppermost or major cover portion 10 which is of pliable and moisture absorbent rough-surfaced material such as cotton fabric (not woolen), upholstering material, etc., which has a plurality of small, spaced-apart raised portions disposed over its surfaces and extending outwardly therefrom. A cloth known as Terry cloth, particularly a heavy Terry cloth, may also be employed although a heavy upholstering material is the preferred material. The portion 10 is constructed from the appropriate material cut or fashioned substantially in the form of a Greek cross with four arms 11 and a central part 12, an outer face or surface 13 and inner face or surface 14. The outer parts of the arms 11 are doubled over, substantially upon the dotted lines 15 and secured in any approved way to the inner parts of the arms, as by stitches 16 to provide four hems 17 with open ends.

Next, a rectangular intermediate or innermost portion 18 of resilient or spongy flexible material is laid upon the central part 12. Preferably the material comprising the portion 18 is cellulose sponge and is slightly less in area than the area of the central part. As for thickness, a desirable thickness is substantially one-quarter inch.

A lowermost or minor cover portion 19 of rectangular shape, shown in Fig. 2, having a resilient portion-contacting face 20 and a pedal head-contacting face 21, is laid over the portion 18 and secured to the portion 10 in any approved way, such as by the stitches 22. The portion 19 is preferably of the same material as that of the portion 10. It is obvious that the portion 19 be of slightly greater area than that of the portion 18 so it may extend over a face of the portion 18, over the end and side face of the portion 18 and over a small part of the adjacent portion 10. By "slightly" I mean that, for a practical example, the portion 19 may be 3¼" x 4½" while the portion 18 may be 2½" x 3½" and ¼" thick. That is, the difference may be ¾" to 1". Of course, the portion 19 may be secured to the portion 10 by stitches 22 around three edge parts of the portion 19, the portion 18 then inserted and the fourth edge part then stitched by stitches 22. In any case, there is now provided a partly-completed cover with all exposed surfaces roughened.

Means 23 to detachably secure the cover to a pedal B or C preferably comprises a suitable length of stretchable material, such as elastic, threaded through the hems 17, and the hems 17 and associated portions of the arms 11 drawn together into a pucker as in Fig. 4, and the end portions 24, of the length of material 21 tied together. This completes the formation of the cover A which has an outer surface comprising the face 13 of the portion 10, minus the doubled-over parts of the arms 11, and defining a pedal-accommodating pocket 25 having a mouth 26.

The cover A is readily slipped over a head of a pedal B or C since the mouth 26 may be stretched considerably and the mouth will then close around the underside 30 of the pedal head with the mouth 26 encircling the pedal lever 33 transversely and with the face 19 in good contact with the upper face 31 of the pedal head. The raised portions of the face 21 of the material of the portion 19 will tend to sink into the recesses 32 of the pedal face 31 and the raised portions of the face 13 of the portion 10 in contact with the shoe sole of an operator will provide a surface over which a wet or iced sole will not be as apt to slip as if the surface 13 were smooth; moreover the moisture-absorbent material of the portion 10 tends to take up moisture from the under face of the shoe sole.

Various changes may be made to the form of the invention herein shown and described without departing from the spirit of the invention or scope of the claims.

What is claimed is:

1. An anti-slip pocketed cover for the normally footwear-contacting portion of a motor vehicle pedal, said pocketed cover including a footwear-contacting cover portion having a decidedly roughened outer surface and being of moisture-absorbent pliable material and formed from a Greek cross-shaped section of said material, with the arms of said Greek cross-shaped section provided with puckering means-accommodating outer ends, a pedal face-contacting portion of the shape of the central part of the Greek cross-shaped section and slightly greater in area than the area of said section, an intermediate portion between said section and said pedal face-contacting portion, means securing said pedal face-contacting portion and said section together with said intermediate portion between them, and puckering means for puckering said arms at the outer ends of the arms, whereby said arms and said pedal face-contacting portion define a pedal-accommodating pocket with the mouth of said pocket encircling the pedal lever transversely of the lever.

2. An anti-slip pocketed cover according to claim 1 characterized in that the first-named portion is of upholstering material.

3. An anti-slip cover for the normally footwear-contacting portion of a motor vehicle pedal, said cover including an uppermost cover portion of pliable moisture absorbent material, an innermost portion of resilient spongy material, a lowermost portion, for contact with the upper face of the footwear-contacting portion of the pedal, said uppermost portion being formed from a Greek cross-shaped section of material with the central part thereof in face contact with said innermost portion and the arms of said Greek cross-shaped section being provided with hems, means securing the uppermost and lowermost portions together with the innermost portion pocketed between them, and means to secure the three portions to the normally footwear-contacting portion of a pedal, comprising a continuous length of stretchable material within said hems with said hems puckered by said continuous length of stretchable material and with said arms drawn together with their outer ends defining a mouth.

References Cited in the file of this patent

UNITED STATES PATENTS

| | | |
|---|---|---|
| 1,190,781 | Maher | July 11, 1916 |
| 1,530,088 | Nathan | Mar. 17, 1925 |
| 1,562,993 | Stanwood | Nov. 24, 1925 |
| 1,633,988 | Jones | June 28, 1927 |
| 1,997,738 | Maxedon et al. | Apr. 16, 1935 |
| 2,078,059 | Churchill | Apr. 20, 1937 |
| 2,449,575 | Wilhelm | Sept. 21, 1948 |

FOREIGN PATENTS

| | | |
|---|---|---|
| 9,528 | Great Britain | Sept. 18, 1913 |